Patented Feb. 3, 1931

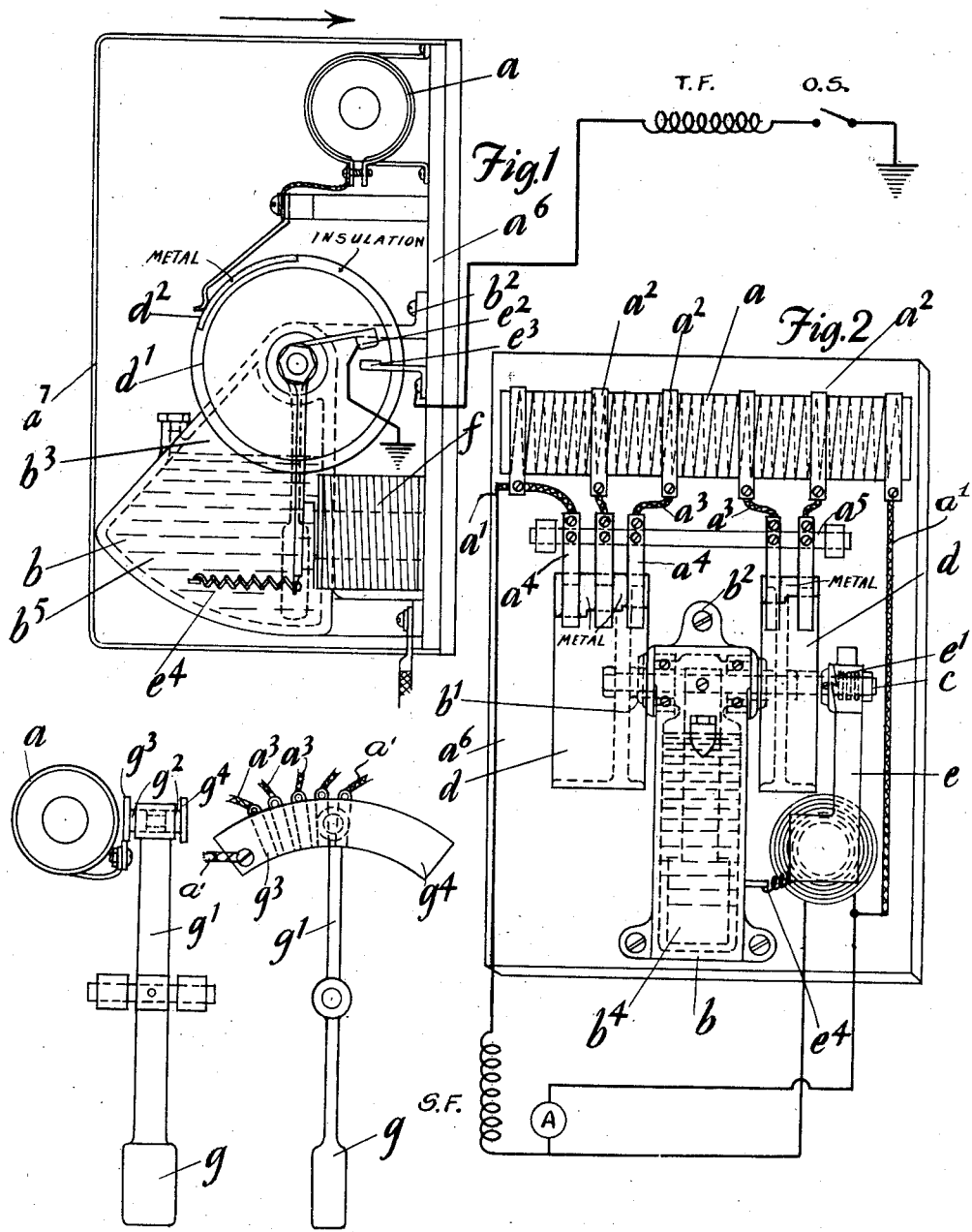

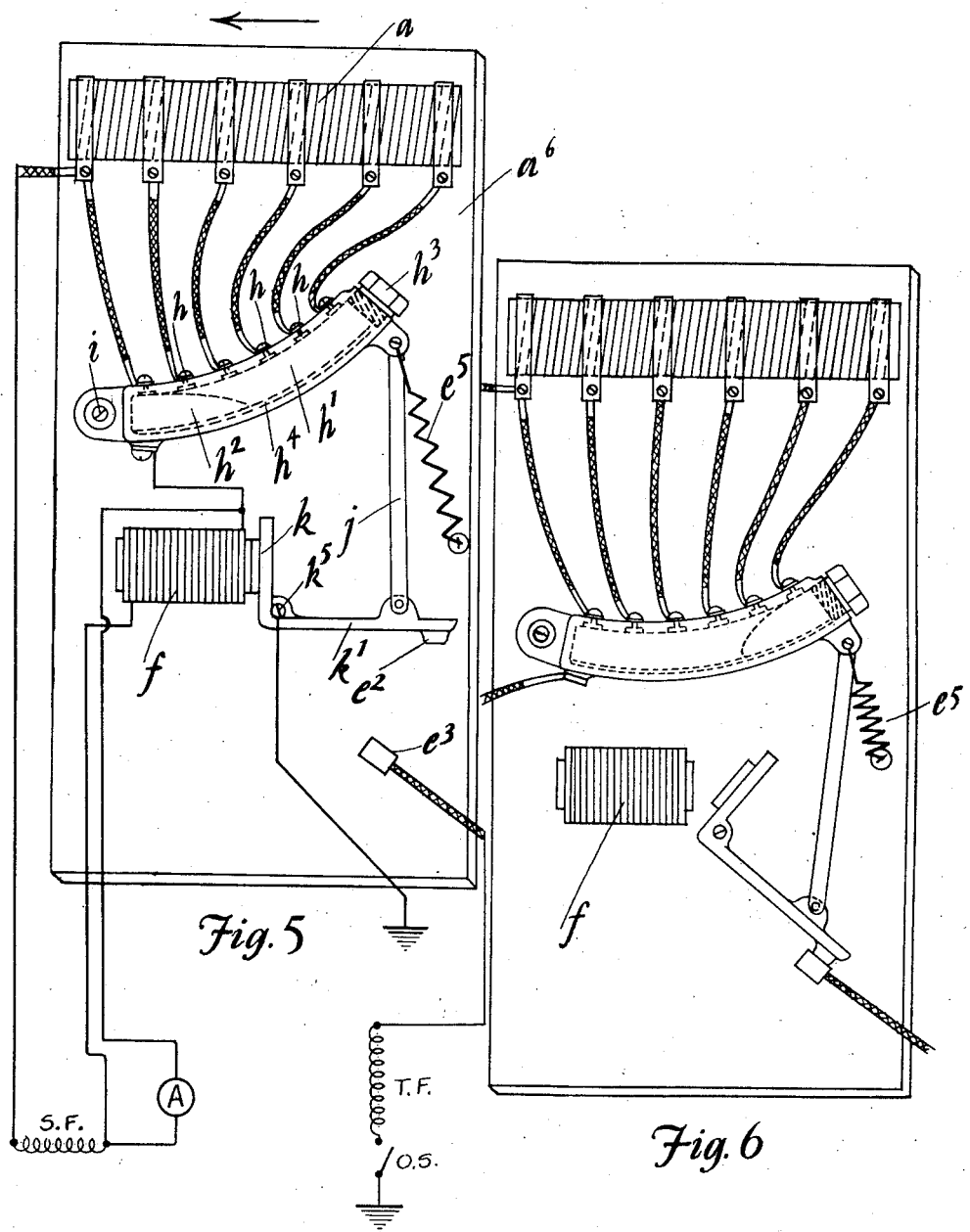

1,791,164

UNITED STATES PATENT OFFICE

CHARLES FROESCH, OF NEW YORK, N. Y., ASSIGNOR TO INTERNATIONAL MOTOR COMPANY, OF NEW YORK, N. Y., A CORPORATION OF DELAWARE

AUTOMATIC CONTROL FOR FIELD RESISTANCE

Application filed July 9, 1927. Serial No. 204,473.

The present invention relates to automatic controlling devices for adjusting the amount of resistance to be inserted in the shunt field of a generator and deals particularly with such mechanism when used in connection with a generator mounted on a vehicle and driven by the engine to supply current to the driving motors.

With installations of this type it is necessary that a relatively large torque be available during acceleration and with the vehicle well on its way its operation should then be such that the field current is in accord with the conditions of most favorable and efficient operation. After initial acceleration, it has been the practice to cut out the resistance of the shunt field of the generator to restore the shunt field current to its normal value, a suitable variable resistance having been adjusted to provide maximum torque for starting.

Having in mind the fact that as the speed of the vehicle picks up, resistance is to be cut out of the shunt field circuit, the present invention proposes to supply an automatic means for cutting out the resistance proportionately as the speed of the vehicle increases, and the inertia of a movable body on the vehicle is utilized to control the automatic regulation of the field circuit.

More particularly, an object of the invention is to provide a switch mechanism, which is initially operated before acceleration starts, to cut in all of the resistance in the shunt field and adapted to cut out the resistance as the vehicle gradually picks up to running speed, the latter operation being effected by the pendulum movement of a freely movable suspended body or the flow of a fluid, such as mercury, when acted upon by the accelerating force of the vehicle.

Further and other objects of the invention will appear as the description proceeds and reference will now be had to the accompanying drawings for a more detailed description of the invention, wherein:

Figure 1 is a side elevation of one form of the invention showing a pendulum mounted upon a shaft carrying the contact drum and related mechanism to effect the proper operation of the switch. The parts are shown in the positions they assume when the vehicle is travelling at a normal, more or less constant speed.

Figure 2 is a front elevation of the device shown in Figure 1 but with the drums moved to cause the contacts to engage the conducting portions thereof. The resistance is thus shown all in circuit, as when the vehicle is at rest or accelerating rapidly.

Figure 3 is a modified form of the invention.

Figure 4 is a front elevation of the device shown in Figure 3.

Figure 5 is a front elevation of a further modified form of the invention wherein a mercury switch is used to vary the resistance in the field circuit.

Figure 6 is a view similar to Figure 5, showing the switch in its initial position prior to the acceleration of the vehicle.

Referring particularly to Figures 1 and 2, the reference character $a$ designates a resistance which is connected in the circuit of the shunt field S. F. to be controlled. Wires $a'$ connect the resistance in this circuit, and taps $a^2$ are provided to permit portions of the resistance to be inserted in the field circuit or cut out of the circuit. Connected to these taps through suitable pig tails $a^3$ are contacts $a^4$ which are mounted upon a suitable cross bar $a^5$ secured to the switch panel $a^6$. A suitable housing $a^7$, shown in Figure 1, but removed in Figure 2, is provided to cover the mechanism. Mounted upon the panel $a^6$ is a housing $b$ provided with bearings $b'$ in which a shaft $c$ is mounted. The housing is secured to the panel by screws $b^2$ and is provided with an enclosure $b^3$ in which a pendulum $b^4$ is adapted to move. This pendulum is mounted fixedly upon shaft $c$.

At either end of the housing, and upon shaft $c$, drums $d$ are mounted. These drums are provided with insulated portions $d'$ and conducting portions $d^2$ upon which contacts $a^4$ wipe as the drums $d$ rotate. It will be seen from Figure 2 that as the pendulum moves back to its vertical position as shown in Figure 1, the contacts $a^4$ will successively come to ride upon the conducting portions of the drums to cut out portions of the resistance $a$ by short circuiting them. Bearing in mind that all of the resistance is to be cut out when the vehicle is running at normal speed, it will be seen that as the force of gravity exerted upon the pendulum gradually overcomes the inertia of the pendulum which holds it in a position at an angle to the vertical, the contacts $a^4$ will progressively cut out portions of the resistance from left to right in Figure 2. Therefore, as full speed is approached, the desired condition is obtained automatically by the pendulum $b^4$.

Upon an extreme end of shaft $c$, an armature $e$ is mounted. A suitable slip clutch connection $e'$ is provided to permit the armature to move in one direction with respect to shaft $c$. When moved in the other direction, however, the clutch $e'$ is engaged to cause shaft $c$ to move with the armature. Contact $e^2$ is mounted upon the armature and engages contact $e^3$ mounted upon the switch panel to close the circuit of teaser field T. F. Operating switch O. S. additionally serves to control this circuit. Spring $e^4$ is connected to the armature and housing $b$ to retract, normally, the former and close contacts $e^2$ and $e^3$. Magnet $f$ is connected in the shunt field circuit and serves to attract armature $e$ when the current through such field reaches a predetermined amount. When such condition exists, the armature $e$ is attracted to break the teaser field circuit, its movement causing the clutch to slip and permitting shaft $c$ to remain in a position to which it has been moved.

The operation of the device is as follows. Assuming the vehicle is to move in the direction of the arrow at the top of Figure 1, spring $e^4$ normally closes contacts $e^2$ and $e^3$ and moves the drums $d$ to a position such that the wipers $a^4$ engage the insulating portions, $d'$, thereof. The pendulum bob $b^4$ is thus moved to a position at the left of the housing and while the vehicle accelerates, is maintained in such position regardless of the position of armature $e$. When the magnet $f$ has been energized sufficiently, the armature $e$ is attracted but its movement is not accompanied by a corresponding movement of the pendulum $b^4$ by reason of the slip clutch connection $e'$. The pendulum does not resume its vertical position until the acceleration has fallen off sufficiently to permit gravity to overcome completely the inertia thereof.

A suitable fluid $b^5$, such as kerosene, is carried in the housing $b$ to smooth out the irregular movement of pendulum $b^4$ and cause the operation of the switch to produce a uniformly progressive change of resistance in the field.

In Figures 3 and 4 a modified form of the invention is shown wherein the pendulum $g$ is mounted in any preferred manner upon a switch panel, and carries the wiping contact elements directly thereon. In the form shown, extension $g'$ on the pendulum carries contact elements $g^2$ which engage opposed contacts $g^3$ and $g^4$ to cut out predetermined portions of the resistance $a$. The contacts $g^3$ are connected through the pig tails $a^3$, as in Figures 1 and 2, with portions of the resistance $a$, and the conducting contact $g^4$ enables such portions of the resistance to be cut out. As the vehicle moves in the direction opposing the arrow in Figure 1, the pendulum bob $g$ will be moved to the right, and cause the contacts $g^2$ to move to the left in Figure 4. This cuts in all of the resistance and portions thereof are cut out by opposite movement of the pendulum as it assumes its normal position as the acceleration of the vehicle drops off.

Figures 5 and 6 show a further modified form wherein resistance $a$ is connected, at several points, with contacts $h$ instead of the wiping contacts $a^4$ as shown in Figures 1 and 2. A hollow tubular housing $h'$ carrying contacts $h$ is pivoted at $i$ to the switch panel $a^6$. Within the housing $h'$, a column of mercury $h^2$ is provided, it being inserted by removing cap $h^3$. At the bottom of housing $h'$ a conducting strip $h^4$ is carried and contact is thus made between contacts $h$ and $h^4$ by the column of mercury $h^2$ to cut in or out portions of the resistance $a$.

A link $j$ is connected at one end to housing $h'$ and at the other end to an arm $k'$ carried with the armature $k$ which is pivoted at $k^5$. Contacts $e^2$ and $e^3$ similar to those of Figures 1 and 2 control the teaser field circuit above referred to, and spring $e^5$ serves to retract the armature and housing and normally close contacts $e^2$ and $e^3$ as in Figures 1 and 2. Magnet $f$ serves the same function as in Figures 1 and 2 and it will be apparent that when the vehicle is being accelerated in the direction of the arrows at the top of Figure 5, the mercury column having been moved to the position shown in Figure 6 by spring $e^5$ will remain in such position even after magnet $f$ has been sufficiently energized to attract armature $k$ by reason of the inertia effect of mercury column $h^2$. As the force of gravity overcomes the inertia of mercury $h^2$, the latter will move down the tube to the left, to cut out, progressively, portions of the resistance $a$. When the vehicle has reached its normal running condition, all of the resistance will be cut out and the condition desired is effected.

The foregoing description when considered with the accompanying drawings forming a part hereof serves to illustrate preferred forms of the invention but it is to be understood that other modifications thereof are contemplated, the invention not being limited, save as defined by the appended claims.

What I claim is:

1. In combination with a dynamo having a variable field resistance, means to insert a predetermined maximum of the resistance in the circuit initially, movable contact means operable to vary the resistance by the inertia of such means, and means to connect, operatively, the two last named means for simultaneous movement.

2. In combination with a dynamo having a variable field resistance, means to insert a predetermined maximum of the resistance in the circuit initially, movable contact means operable to vary the resistance by the inertia of such means, and means to connect, operatively, the two last named means for simultaneous movement in one direction, and permit relative movement in the other direction.

3. In combination with a dynamo having a variable field resistance, a movable member adapted to cut out, progressively, portions of the resistance, an inertia member connected to the movable member and adapted to move the same relative to the contact points, means to maintain the movable member in a position to insert all of the resistance in the circuit and means to permit the inertia means to vary the resistance after initial movement thereof.

4. In combination with a dynamo having a variable field resistance, a contact drum, contacting portions on the drum adapted to cut out portions of the resistance progressively, a pendulum connected to the drum, an armature, a slip clutch connection between the armature and the drum, and a spring connected to the armature to move the drum normally to cut in all of the resistance.

5. In combination with a dynamo having a variable field resistance, a contact drum, contacting portions on the drum adapted to cut out portions of the resistance progressively, a pendulum connected to the drum, an armature, a slip clutch connection between the armature and the drum, contacts carried by the armature and a spring connected to the armature to move the drum normally to cut in all of the resistance.

6. In combination with a dynamo having a variable field resistance, a contact drum, contacting portions on the drum adapted to cut out portions of the resistance progressively, a pendulum connected to the drum, an armature, a slip clutch connection between the armature and the drum, a teaser field circuit, contacts carried by the armature to break the teaser field circuit, a spring connected to the armature to move the drum normally to cut in all of the resistance, and a magnet in the field circuit of the machine to move the armature against the spring thereby permitting the pendulum to move the drum according to its inertia.

7. In combination with a dynamo having a variable field resistance, a contact drum, contacting portions on the drum adapted to cut out portions of the resistance progressively, a pendulum connected to the drum, a housing for the pendulum, means in the housing to retard the movement of the pendulum, an armature, a slip clutch connection between the armature and the drum, and a spring connected to the armature to move the drum normally to cut in all of the resistance.

This specification signed this 30 day of June A. D. 1927.

CHARLES FROESCH.